United States Patent [19]
Sano

[11] Patent No.: US 6,184,940 B1
[45] Date of Patent: Feb. 6, 2001

[54] IMAGING APPARATUS WITH DUAL WHITE BALANCE ADJUSTING SYSTEMS FOR DIFFERENT COLOR TEMPERATURES

[75] Inventor: Toshiyuki Sano, Yokohama (JP)

[73] Assignee: Matsushita Electric Industrial Co., Ltd., Osaka (JP)

[*] Notice: Under 35 U.S.C. 154(b), the term of this patent shall be extended for 0 days.

[21] Appl. No.: 09/041,751

[22] Filed: Mar. 13, 1998

[30] Foreign Application Priority Data

Mar. 14, 1997 (JP) .................................. 9-079168

[51] Int. Cl.[7] .................... H04N 9/73; H04N 5/235
[52] U.S. Cl. ................ 348/655; 348/221; 348/224; 348/229; 348/230
[58] Field of Search .............................. 348/221, 222, 348/223, 224, 225, 228, 229, 230, 655, 656, 362, 363, 364, 365, 366, 367

[56] References Cited

U.S. PATENT DOCUMENTS

| | | |
|---|---|---|
| 4,901,152 | 2/1990 | Hieda et al. . |
| 5,420,635 * | 5/1995 | Konishi et al. ...................... 348/362 |
| 5,473,375 * | 12/1995 | Takayama et al. .................. 348/364 |
| 5,801,773 * | 9/1998 | Ikeda .................................... 348/229 |
| 5,877,810 * | 3/1999 | Inuiya et al. .................... 348/229 X |
| 5,969,761 * | 10/1999 | Takahashi et al. ............. 348/229 X |
| 5,982,424 * | 11/1999 | Simerly et al. ...................... 348/229 |

FOREIGN PATENT DOCUMENTS

| | | |
|---|---|---|
| 61-57759 | 4/1986 | (JP) . |
| 1-60177 | 3/1989 | (JP) . |
| 05103256 | 4/1993 | (JP) . |
| 06189182 | 7/1994 | (JP) . |
| 06189183 | 7/1994 | (JP) . |
| 09037145 | 2/1997 | (JP) . |
| 09149317 | 6/1997 | (JP) . |

* cited by examiner

Primary Examiner—John W. Miller
(74) Attorney, Agent, or Firm—Israel Gopstein

[57] ABSTRACT

In an imaging apparatus, a signal obtained through a long exposed signal and a shortly exposed signal are synthesized into a luminance signals, a color difference (CD) signal R–G and a CD signal B–G to yield a video signal. The shortly exposed signal has been modulated by one of four colors. The magnitude of each pixel value in the shortly exposed signal is multiplied by one of four gains (prepared for the four colors) associated with the modulation color. The magnitudes of colors, e.g., R and B are multiplied by first and second gains, respectively. The microcontroller provides, for each field, a long/short mode signal. In each field of the short mode, the controller finds the four gains such that at least one of averages of the first and second CD signals converges on a predetermined target value (e.g., 0). In each field of the long mode, the controller finds the first and second gains such that said at least one of said averages converges on the value.

10 Claims, 3 Drawing Sheets

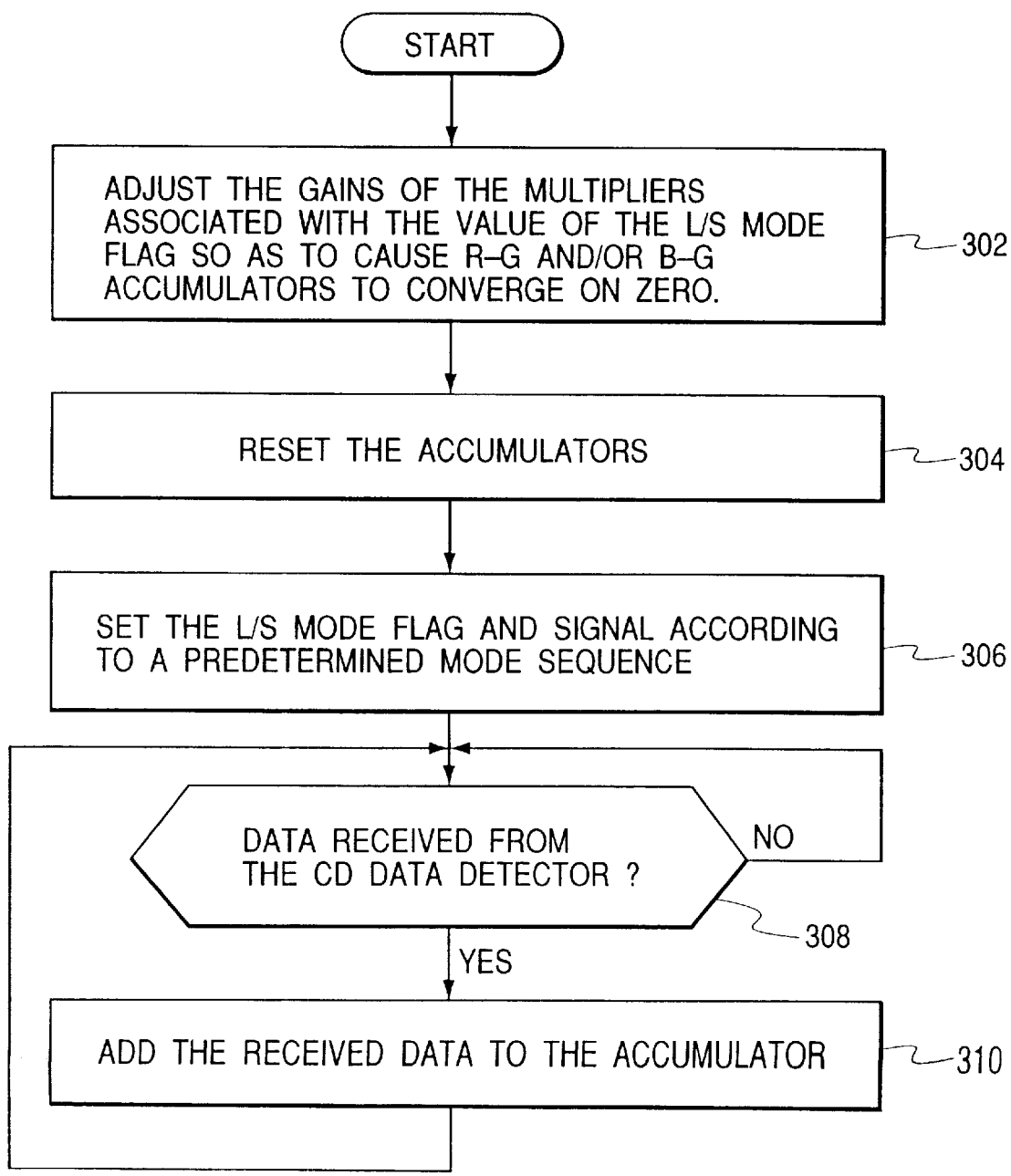

US 6,184,940 B1

IMAGING APPARATUS WITH DUAL WHITE BALANCE ADJUSTING SYSTEMS FOR DIFFERENT COLOR TEMPERATURES

BACKGROUND OF THE INVENTION

1. Field of the Invention

The invention relates to an imaging apparatus for use in a video camera and more specifically to an imaging apparatus capable of separately adjusting the white balances for two subjects of different color temperatures.

2. Description of the Prior Art

Conventional imaging apparatuses used in video cameras have only one white balance control system. In such imaging apparatus, the adjustment of white balance is achieved by adjusting the sensitivity of color channel amplifiers in response to the averages of color difference signals. However, there may be more than one subject of different color temperatures (like indoor and outdoor) in a view. If the white balance is adjusted in preference to an indoor portion of the image, the white balance will not be maintained in outdoor portion(s) and vice versa.

Thus, a need exists in the art for an imaging apparatus capable of adjusting both of the white balances for different color temperatures.

SUMMARY OF THE INVENTION

The above and other needs are met by an imaging apparatus capable of separately adjusting white balances for a long exposed image portion and a shortly exposed image portion in which a signal obtained through a long exposure (hereinafter, referred to as a "long exposed signal") and a signal obtained through a short exposure (hereinafter, referred to as a "shortly exposed signal"), respectively are synthesized into a luminance signal, a first color difference (referred to as "CD") signal (e.g., R–G), and a second CD signal (e.g., B–G) to yield a video signal and in which the shortly exposed signal has been modulated by one of four colors. The imaging apparatus at least comprises: a microcontroller comprising a microcomputer; a multiplier for multiplying the magnitude of each pixel value in the shortly exposed signal by one of four gains (prepared for the four colors) associated with the modulation color; and a multiplier for multiplying the magnitudes of a first one (R in this example) and a second one (B in this example) of three primary colors which are unique components of the first and second CD signals by first and second gains, respectively. The microcontroller provides, substantially for each field, a signal indicative of one of long and short modes. In each field of the short mode, the controller finds the four gains to adjust the magnitude of the shortly exposed signal such that at least one of an average of the first CD signal and an average of the second CD signal converges on a predetermined target value. In each field of the long mode, the controller finds the first and second gains to adjust the magnitudes of the first color (R) and a second color (B), respectively, such that said at least one of said averages converges on the predetermined target value.

BRIEF DESCRIPTION OF THE DRAWING

Further objects and advantages of the present invention will be apparent from the following description of the preferred embodiments of the invention as illustrated in the accompanying drawing, in which:

FIG. 3 is a flow chart showing an operation of the microcontroller for controlling the white balance adjustment in accordance with the principles of the invention.

Throughout the drawing, the same elements when shown in more than one figure are designated by the same reference numerals.

DETAILED DESCRIPTION OF THE PREFERRED EMBODIMENTS

Figure 1:
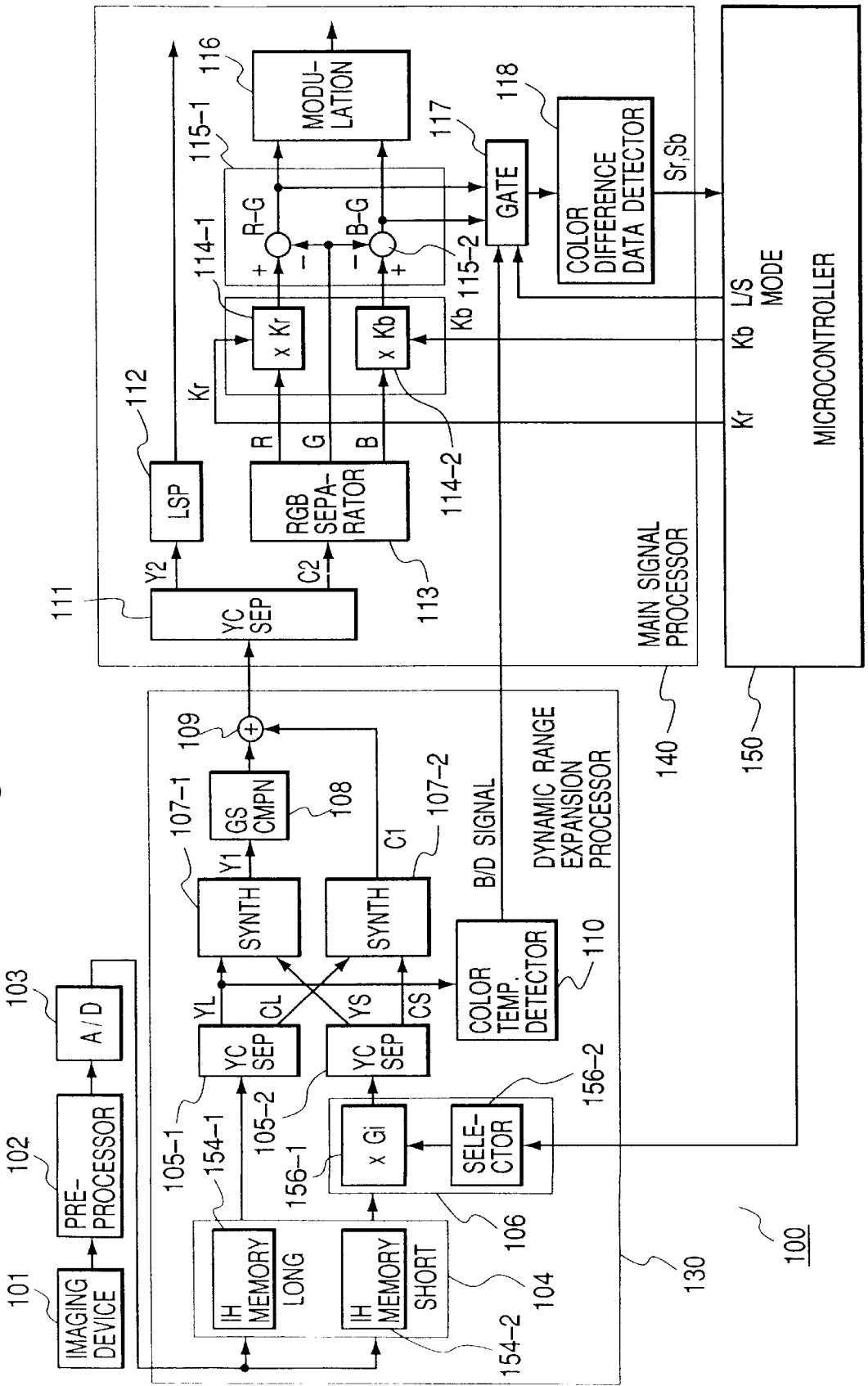
FIG. 1 is a block diagram showing an arrangement of an imaging apparatus in accordance with an illustrative embodiment of the invention.

FIG. 1 is a block diagram showing an arrangement of an imaging apparatus which separately adjusts the white balances of image signals obtained through longer time exposure and short-time exposure in accordance with an illustrative embodiment of the invention. In FIG. 1, the imaging apparatus 100 comprises an imaging device 101, a preprocessor 102 having its input connected to the imaging device 101, an A/D (analog to digital) converter 103 having its input connected to the preprocessor 102 output, a dynamic range expansion processor 130 having an input thereof connected to the A/D converter 103 output, a main signal processor 140 and a microcontroller 150. The controller 117 may be any suitable microcomputer.

The dynamic range expansion processor 130 comprises: a dual-channel time scale converter 104 with two 1-line memories 154-1 and 154-2 which has the two inputs thereof connected to the A/D converter 103 output; a first (or long) luminance-color signal separator (YC SEP) 105-1 having its input connected to a dual-channel time scale converter 104 first channel (or long channel) output for a long-time exposed image signal; a multiplier 106, having its data input connected to a dual-channel time scale converter 104 second channel (or short channel) output for a short-time exposed image signal and its control input connected to a gain control output of the microcontroller 150, for adjusting the white balance of the short-time exposed image signal; a second luminance-color signal separator (YC SEP) 105-2 having its input connected to a multiplier 106 data output; a first synthesizer (SYNTH) 107-1 having two inputs thereof connected to a first YC separator 105-1 $Y_L$ (long channel luminance) output and a second YC separator 105-2 $Y_S$ (short channel luminance) output; a second synthesizer 107-2 having two inputs thereof connected to a first YC separator 105-1 $C_L$ (long channel color) output and a second YC separator 105-2 $C_S$ (short channel color) output; a gray scale compensator 108 having its input connected to a first synthesizer 107-1 output; an adder 109 having its two inputs connected to a gray scale compensator 108 output and a second synthesizer 107-2 output; and a color temperature detector 110 having its input connected to the $Y_L$ signal terminals of the first YC separator 105-1 and the first synthesizer 107-1.

The main signal processor 140 comprises: a luminance-color signal separator (YC SEP) 111 having its input connected to an adder 109 output; a luminance signal processor 112 having its input connected to a YC separator 111 luminance signal output and its output treated as a luminance signal output of the imaging apparatus 100; an RIB separator 113 having its input connected to a YC separator 111 color signal output; a first multiplier (×Kr) 114-1 having its multiplicand input connected to an RIB separator 113 R-output and its coefficient input is connected to a microcontroller 150 coefficient Kr output; a second multiplier (×Kb) 114-2 having its multiplicand input connected to an RIB separator 113 B-output and its multiplier input is connected to a microcontroller 150 coefficient Kb output; a first subtracter (R–G) 115-1 having its minuend input connected to a first multiplier 114-1 output and its subtrahend input connected to an RIB separator 113 G-output; a second subtracter (B–G) 115-2 having its minuend input connected to a second multiplier 114-2 output and its subtrahend input connected to the RIB separator 113 G-output; a color difference signal modulator 116 its two inputs connected to a first and second subtracter 115 outputs; a dual-channel gate circuit 117 having its dual channel inputs connected to the first and second subtracter 115 outputs and its control inputs connected to a color temperature detector 110 bright/dark signal output and a microcontroller 150 long/short signal output; and a color difference data detector 118 connected to the gate circuit 117 and the controller 150.

The imaging device 101 is configured to alternately output a first image signal having been obtained through long time (say, approximately (1/60–1/1000) second) exposures and a second image signal having been obtained through short time (say, 1/1000 second) exposures at twice the normal transfer rate of a horizontal CCD (charge coupled device) in one field of time. Thus output first (long exposed) and second (shortly exposed) image signals are subjected to preprocessing such as CDS (correlated double sampling), AGC (automatic gain control), etc. by the preprocessor 102, converted into digital signals by the A/D converter 103, temporarily stored in the 1-line memories 154-1 and 154-2, respectively, of the time scale converter 104, and concurrently read out of the memories 154 at the normal speed.

In order to facilitate understanding, of the above the elements other than elements directly related to the present invention will be first described, and then the latter elements will be described in great detail.

If the imaging device 101 is one for use in a single camera with a mosaic type color filter, then the two image signals of different exposure times output from the time scale converter 104 will include color modulated components. In order to synthesize the two image signals in a predetermined luminance level, the first (long exposed) and second (shortly exposed) image signals are once separated by the YC separators 105-1 and 105-2 into luminance signals $Y_L$ and $Y_S$ and color modulated components $C_L$ and $C_S$, respectively (Subscripts L and S indicate that the elements identified by the references including the subscripts are associated with the long exposed image signal and the shortly exposed image signal, respectively). The luminance signals $Y_L$ and $Y_S$ and color modulated components $C_L$ and $C_S$ are synthesized by the synthesizer 107-1 and 107-2 into a luminance signal Y1 and a color signal C1, respectively.

The synthesized luminance signal Y1 is compensated in gray scale by the gray scale compensator 108 such that the larger the histogram frequencies of gray scales are, the more the contrasts between the gray scales are emphasized. Then, the gray scale compensated luminance signal has the color signal C1 added thereto, and is sent to the main signal processor 140.

It is noted that it may be preferable to realize the dynamic range expansion processor 130 and the main signal processor 140 as separate ICs. In such a case, the luminance signal and the color modulated signal are preferably dealt with in a multiplexed form.

In the main signal processor 140, the luminance signal from the dynamic range expansion processor 130 is again separated by the YC separator 111 into a luminance signal Y2 and a color carrier component C2. The luminance signal Y2 is processed by the luminance signal processor 112. The color carrier component C2 is separated by the RGB separator 113 into three primary RGB colors. The color components R and B are multiplied by the coefficients Kr and Kb supplied from the microcontroller 150 yielding color difference signals Kr·R–G and Kb·B–G, which are modulated with subcarriers by the chrominance modulator 116 into a modulated chrominance signal. Then the modulated chrominance signal is combined with the luminance signal from the element 112 to yield a composite image signal. It is noted that Kr·R–G and Kb·B–G indicate the value of the color difference signals. However, the simplified expressions R–G and B–G are used as symbols indicating the outputs of the subtracters 115-1 and 115-2.

Figure 2:
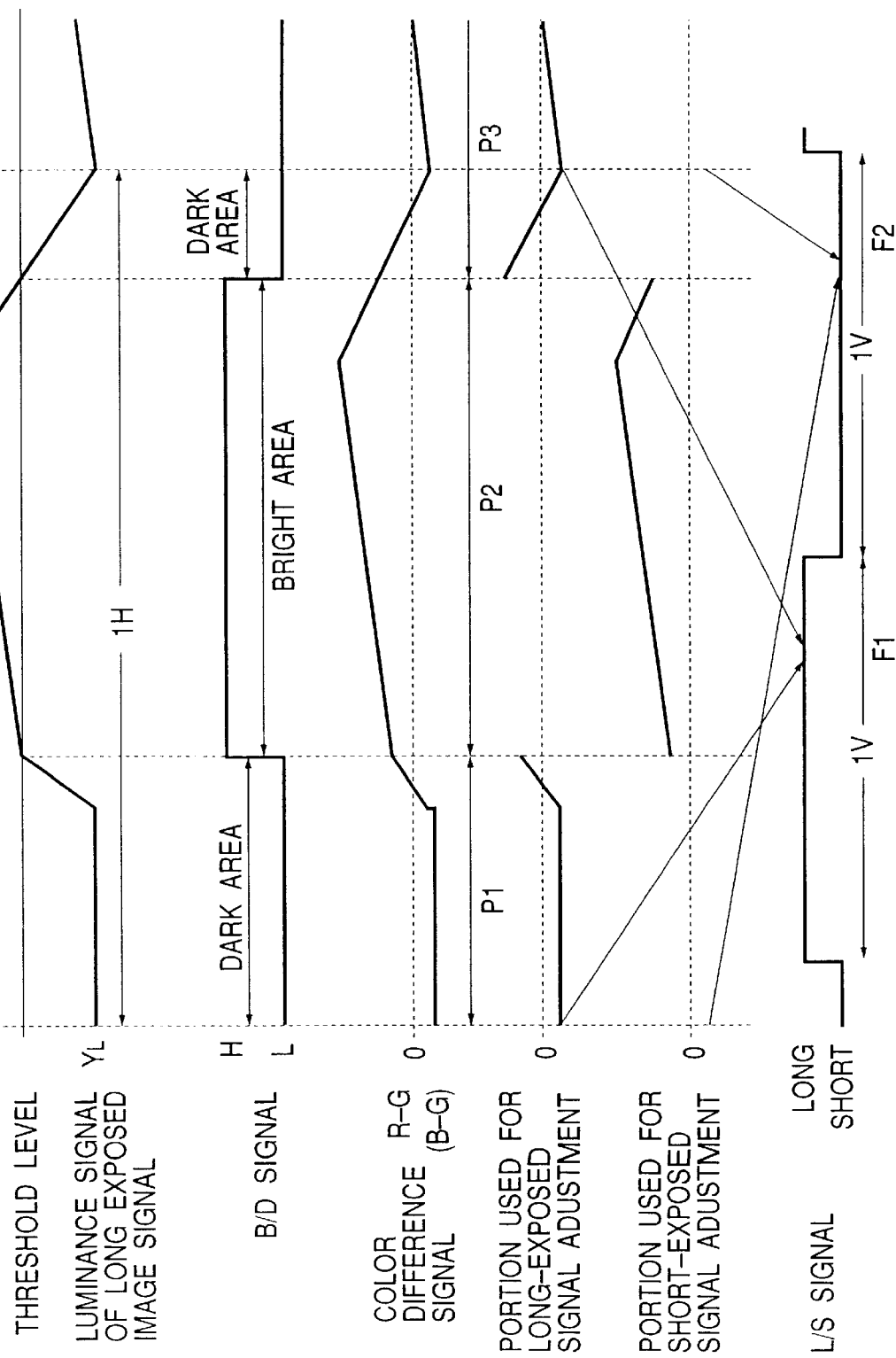
FIG. 2 is a diagram illustrating an operation of gathering data for use in determining the value used for a white balance adjustment.

Referring now to FIG. 2 as well as FIG. 1, white balance adjustment according to the principles of the invention will be described in the following. FIG. 2 is a diagram illustrating an operation of gathering data for use in determining values used for the white balance adjustment, i.e., gains of the multipliers 106, 114-1 and 114-2. In this specific illustrative embodiment, color difference data necessary for adjusting the white balance of the above mentioned long-exposed image signal and data necessary for adjusting the white balance of the above mentioned shortly-exposed image signal are gathered in alternate fields, which are referred to as "long mode fields" and "short mode fields", respectively. The mode is specified by the long/short (L/S) mode signal which is supplied from the microcontroller 150 to the gate circuit 117. In this specific example, the L/S mode signal indicates the long mode by logical "1" and the short mode by logical "0" as shown at the bottom of FIG. 2.

In the long (or short) mode, the imaging apparatus is configured to collect color difference data R–G and B–G corresponding to subject(s) of low (or high) color temperature, actually dark (or bright) areas in the view. In order to achieve this, the color temperature detector 110 compares the luminance signal $Y_L$ from the YC separator 105-1 with a predetermined threshold level to output a bright/dark (B/D) signal indicative of whether the luminance signal $Y_L$ is in a bright area or not (i.e., a dark area) as shown in FIG. 2. If the luminance signal $Y_L$ is higher than the threshold level, then the B/D signal is logical "1" and logical "0" otherwise. The B/D signal is supplied to the gate circuit 117. The gate circuit 117 is configured to pass the color difference signals R–G and B–G to the color difference (hereinafter, referred to as "CD") data detector 118 only if the long/short mode signal and the bright/dark signal have different logical values as shown in the following table.

Gate State Table

| B/D signal | L/S mode | |
| --- | --- | --- |
| | Short mode (0) | Long mode (1) |
| Dark (0) | Close | Open |
| Bright (1) | Open | Close |

Specifically, in the short mode (field), e.g., a field F2 in FIG. 2, the signals R–G and B–G (only one is shown) are passed in case of a high (logical "1") B/D signal, that is, CD signal portion P2 (shown as PORTION USED FOR SHORT-EXPOSED SIGNAL ADJUSTMENT) is received by the detector 11 but there is no signal supplied for periods P1 or P3. In the long mode (field), e.g., a field F1, the signals R–G and B–G are passed in case of a low (logical "0") B/D signal, that is, CD signal portions P1 and P3 (shown as PORTION USED FOR LONG-EXPOSED SIGNAL ADJUSTMENT) are received by the detector 11 but there is no signal supplied for period P2.

On receiving the color difference signals R–G and B–G, the color difference data detector 118, which has two adders (not shown) calculates a sum of every predetermined number of received color difference digital values for each color difference signal R–G, B–G and passes the calculated sums Sr and Sb to the microcontroller 150. The purpose of this detector 118 is reducing the load of the microcontroller 150. Accordingly, the predetermined number may be set to any suitable value according to the resolution of the imaging device 101 and the speed of the microcontroller 150. For example, the number may be a forty-eighth of the number of pixels in a horizontal line. Alternatively, each horizontal line may be divided into a certain number (e.g., 48) of blocks e.g., B1, B2, . . . , B48 before hand, and sums Sri and Sbi of CD values, if any, may be calculated for each block Bi (i=1, 2, . . . , 48).

According to the principles of the invention, the white balance adjustment in the short mode (field) is made to the shortly-exposed image signal from the 1H-memory 154-2 by the multiplier 106 in the dynamic range expansion processor 130. The multiplier 106 comprises a multiplier 156-1 and a selector 156-2. The multiplier multiplies each pixel data of the shortly-exposed image signal from the 1H-memory 154-2 by a gain Gi (i =1, 2, 3, or 4) supplied from the selector. The selector 156-2 includes four gain registers (not shown) for storing four gains G1, G2, G3 and G4 prepared for the four colors corresponding to the colors of the color filter (not shown) of the imaging device 101. In response to each pixel data from the 1 H-memory 154-2, the selector 156-2 selects and supplies one (Gi) of the four gains G1, G2, G3 and G4 to the gain input of the multiplier 106. The four gains are calculated and stored in the gain registers by the controller 117 as described in detail later.

In the long mode (field), the white balance adjustment is made by controlling the gains Kr and Kb for the multipliers 114-1 and 114-2, respectively, in the main signal processor 140. The multiplier unit 114 has registers for storing the gains Kr and Kb, which are set by the controller 150. In either mode and in each field of the mode, the microcontroller 150 controls the gains to cause each average value of a sum sequence Sr's and a sum sequence Sb's received from the CD data detector 118 during the period of the field to converge on a predetermined target value, i.e., 0 in this example. Since the target value is 0, the gains are actually so controlled that the sum total of each of the sum sequences Sr's and Sb's converges on 0. In addition to this, it should be noted that the gains of the multiplier 106, i.e., G1 through G4 are preferably calculated such that both of the sum of the gains for two colors from which a signal R–Y is generated and the sum of the gains for two colors from which a signal B–Y is generated are kept constant. Doing this facilitates the control of the white balance in the R direction.

FIG. 3 is a flow chart showing an operation of the microcontroller 150 for controlling the white balance adjustment in accordance with the principles of the invention. It is assumed that the controller 150 has a long/short mode flag (not shown) for holding a current mode and storage locations or R–G and B–G accumulators for accumulating the received data from the CD data detector 118. It is also assumed that the operation is initiated by an interruption issued to the CPU (central processing unit) (not shown) of the controller 150 by each vertical sync signal.

In FIG. 3, in step 202 the controller 150 adjust the gains of the multipliers associated with the current mode according to the L/S mode flag so as to cause the values of the R–G and B–G accumulators to converge on zero. That is, in case of the long mode, the controller 150 calculates and stores the gains Kr and Kb in the above mentioned respective registers in the multiplier 114. In case of the short mode, the controller 150 calculates the gains G1 through G4 of the multiplier 106 as described above and stores the calculated gains in respective registers in the multiplier 106. During the short mode, the gains Kr and Kb are fixed.

In step 304, the accumulators are reset. In step 306, the controller 150 sets the L/S mode flag and the L/S mode signal according to a predetermined mode sequence. In this specific embodiment, the controller 150 inverts the L/S mode flag and the L/S mode signal. The controller 150 makes a test to see if data is received from the CD data detector 118 in step 308. If so, the controller 150 adds the received data to the accumulator in step 310 and returns to step 308. Otherwise, the controller 150 returns to step 308. Thus the steps 308 and 310 are repeated till the next interruption.

Though the image signals of long and short exposure times have been obtained by a combination of the imaging device 101 and the time scale converter 104 in the above described illustrative embodiment, each of such image signals may be obtained by using a set of an imaging device, a preprocessor 102 and an A/D converter 103. In this case, the time scale converter 104 is not necessary.

In the embodiment, both of the sums Sr's and Sb's have been collected for calculation in each field by using the dual-channel gate circuit 117 and the CD data detector 118 having two adders. However, the sums Sr's and Sb's may be collected in respective fields of the same long/short mode by changing the L/S mode every two fields. In this case, the gate circuit 118 is replaced with a multiplexer which will need to have an additional control information supplied by the controller 150 to know which of the sums Sr's and Sb's to select and the CD data detector 118 may have only one adder.

Though the L/S mode has been changed every field in the above embodiment, the L/S mode sequence may be determined in various ways. For example, the mode may be changed every predetermined number of fields. Instead of periodical change scheme, any suitable adaptive L/S mode setting algorithm may be used. Preferred one of such algorithms continues the same L/S mode till a convergence is reached with respect to each of the CD signals R–G and B–G, when the L/S mode is changed to the current one to the other.

Many widely different embodiments of the present invention may be constructed without departing from the spirit and scope of the present invention. It should be understood that the present invention is not limited to the specific embodiments described in the specification, except as defined in the appended claims.

What is claimed is:

1. An imaging apparatus for separately adjusting white balance for a long exposed image and a shortly exposed image comprising:
    an imaging device alternately generating in one field period of time a long exposed signal and a shortly exposed;
    a time scale converter which outputs said long exposed signal and shortly exposed signal in a same time axis;
    a synthesizer synthesizing said long exposed signal and said shortly exposed signal, said synthesizer outputting a synthesized image signal;
    a first white balance adjusting device adjusting a white balance of said shortly exposed signal; and a second white balance adjusting device adjusting a white balance of said long exposed signal, wherein said first white balance adjusting device adjusts the white balance of said shortly exposed signal before being synthesized with said long exposed signal by said synthesizer; and said second white balance adjusting device adjusts the white balance of said long exposed signal after being synthesized with said shortly exposed signal by said synthesizer.

2. An imaging apparatus for separately adjusting white balance for a long exposed image and a shortly exposed image comprising:

an imaging device alternately generating in one field period of time a long exposed signal and a shortly exposed signal;

a time scale converter which outputs said long exposed signal and shortly exposed signal in a same time axis;

a synthesizer synthesizing said long exposed signal and said shortly exposed signal, said synthesizer outputting a synthesized image signal;

a first white balance adjusting device adjusting a white balance of said shortly exposed signal; and a second white balance adjusting device adjusting a white balance of said long exposed signal, wherein said first white balance adjusting device adjusts the white balance of said shortly exposed signal after being synthesized with said long exposed signal by said synthesizer; and said second white balance adjusting device adjusts the white balance of said long exposed signal before being synthesized with said shortly exposed signal by said synthesizer.

3. An imaging apparatus for separately adjusting white balance for a long exposed image and a shortly exposed image comprising:

an imaging device alternately generating in one field period of time a long exposed signal and a shortly exposed signal;

a time scale converter which outputs said long exposed signal and shortly exposed signal in a same time axis;

a synthesizer synthesizing said long exposed signal and said shortly exposed signal, said synthesizer outputting a synthesized image signal;

a first white balance adjusting device adjusting a white balance of said shortly exposed signal; and a second white balance adjusting device adjusting a white balance of said long exposed signal;

the imaging apparatus further comprising:
a color difference signal generating device generating a color difference signal of said long exposed signal; and
an average signal generating device generating an average signal of said color difference signal;

wherein said first white balance adjusting device and said second white balance adjusting device adjust the respective signals thereof according to said average signal.

4. An imaging apparatus for separately adjusting white balance for a long exposed image and a shortly exposed image comprising:

an imaging device alternately generating in one field period of time a long exposed signal and a shortly exposed signal;

a time scale converter which outputs said long exposed signal and shortly exposed signal in a same time axis;

a synthesizer synthesizing said long exposed signal and said shortly exposed signal, said synthesizer outputting a synthesized image signal;

a first white balance adjusting device adjusting a white balance of said shortly exposed signal; and a second white balance adjusting device adjusting a white balance of said long exposed signal;

the imaging apparatus further comprising:
a pulse generating device, said pulse indicating a bright area and a dark area of said long exposed signal,
a color difference signal generating device generating a color difference signal of the bright area and the dark area of said long exposed signal referring to said pulse;
an average signal generating device generating an average signal of said color difference signal of a bright area and a dark area respectively;

wherein said first white balance adjusting device adjusts the white balance of said shortly exposed signal according to said average signal of said bright area; and said second white balance adjusting device adjusts the white balance of said long exposed signal according to said average signal of said dark area.

5. An imaging apparatus for separately adjusting white balance for a long exposed image and a shortly exposed image comprising:

an imaging device alternately generating in one field period of time a long exposed signal and a shortly exposed signal;

a time scale converter which outputs said long exposed signal and shortly exposed signal in a same time axis;

a synthesizer synthesizing said long exposed signal and said shortly exposed signal, said synthesizer outputting a synthesized image signal;

a first white balance adjusting device adjusting a white balance of said shortly exposed signal; and a second white balance adjusting device adjusting a white balance of said long exposed signal;

the imaging apparatus further comprising:
an operation completion detection means for detecting completion of operation of said first white balance adjusting device and of said second white balance adjusting device;

wherein said first white balance adjusting device adjusts the white balance of said shortly exposed signal when said second white balance adjusting device completes the adjustment of the white balance of said long exposed signal according to said operation completion detection means.

6. An imaging method comprising the steps of:

alternately providing a long exposed signal and a shortly exposed signal in one field period of time;

converting said long exposed signal and said shortly exposed signal in a same time axis;

synthesizing said long exposed signal and said shortly exposed signal in a synthesized image signal;

adjusting a white balance of said shortly exposed signal; and adjusting a white balance of said long exposed signal, wherein:

said step of adjusting a white balance of said shortly exposed signal is performed before synthesizing said shortly exposed signal and said long exposed signal;

and said step of adjusting a white balance of said long exposed signal is performed after synthesizing said shortly exposed signal and said long exposed signal.

7. An imaging method comprising the steps of:

alternately providing a long exposed signal and a shortly exposed signal in one field period of time;

converting said long exposed signal and said shortly exposed signal in a same time axis;

synthesizing said long exposed signal and said shortly exposed signal in a synthesized image signal;

adjusting a white balance of said shortly exposed signal; and adjusting a white balance of said long exposed signal, wherein:
said step of adjusting a white balance of said long exposed signal is performed before synthesizing said shortly exposed signal and said long exposed signal; and said step of adjusting a white balance of said shortly exposed signal is performed after synthesizing said shortly exposed signal and said long exposed signal.

8. An imaging method comprising the steps of:

alternately providing a long exposed signal and a shortly exposed signal in one field period of time;

converting said long exposed signal and said shortly exposed signal in a same time axis;

synthesizing said long exposed signal and said shortly exposed signal in a synthesized image signal;

adjusting a white balance of said shortly exposed signal; and adjusting a white balance of said long exposed signal;

the imaging method further comprising the steps of:
generating a color difference signal of said long exposed signal;
generating an average signal of said color difference signal;
said step of adjusting a white balance of said shortly exposed signal is performed according to said average signal before synthesizing said shortly exposed signal with said long exposed signal; and
said step of adjusting a white balance of said long exposed signal is performed according to said average signal after synthesizing said shortly exposed signal and said long exposed signal.

9. An imaging method comprising the steps of:

alternately providing a long exposed signal and a shortly exposed signal in one field period of time;

converting said long exposed signal and said shortly exposed signal in a same time axis;

synthesizing said long exposed signal and said shortly exposed signal in a synthesized image signal;

adjusting a white balance of said shortly exposed signal; and adjusting a white balance of said long exposed signal;

the imaging further comprising the steps of:
generating a pulse, said pulse indicating a bright area and a dark area of said long exposed signal,
generating a color difference signal of a bright area and a dark area of said long exposed signal in accordance with said pulse;
generating an average signal of said color difference signal of each of said bright area and said dark area, respectively;
said step of adjusting the white balance of said shortly exposed signal is performed according to said average signal of said bright area; and
said step of adjusting the white balance of said long exposed signal is performed according to said average signal of said dark area.

10. An imaging method comprising the steps of:

alternately providing a long exposed signal and a shortly exposed signal in one field period of time;

converting said long exposed signal and said shortly exposed signal in a same time axis;

synthesizing said long exposed signal and said shortly exposed signal in a synthesized image signal;

adjusting a white balance of said shortly exposed signal; and adjusting a white balance of said long exposed signal, wherein said step of adjusting a white balance of said shortly exposed signal is started upon completion of said step of adjusting a white balance of said long exposed signal.

* * * * *